United States Patent [19]

Fenne et al.

[11] Patent Number: 4,647,832

[45] Date of Patent: Mar. 3, 1987

[54] THREE POSITION SWITCH FOR PORTABLE, RECHARGEABLE DEVICE

[75] Inventors: Kenneth R. Fenne, Glen Ellyn; Wayne D. Steward, Aurora; Witalij Didyk, Addison, all of Ill.

[73] Assignee: Pittway Corporation, Aurora, Ill.

[21] Appl. No.: 748,304

[22] Filed: Jun. 24, 1985

Related U.S. Application Data

[63] Continuation-in-part of Ser. No. 634,774, Jul. 26, 1984, abandoned.

[51] Int. Cl.⁴ ........................ H02J 7/00; H01M 10/46

[52] U.S. Cl. ................................ 320/2; 200/61.58 R; 339/34; 339/58; 362/183

[58] Field of Search ................. 320/2.5; 362/183, 199, 362/200; 339/32, 34, 58; 200/61.58

[56] References Cited

U.S. PATENT DOCUMENTS

| | | | |
|---|---|---|---|
| 1,251,471 | 1/1918 | Brooks . | |
| 2,995,695 | 8/1961 | Reich | 320/2 |
| 3,458,794 | 7/1969 | Bohnstedt et al. | 320/2 |
| 3,513,290 | 5/1970 | Burley et al. | 320/2 |
| 4,086,523 | 4/1978 | Izumi | 320/2 |
| 4,101,757 | 7/1978 | Van Dyck et al. | 339/58 X |
| 4,191,917 | 3/1980 | Brown et al. | 320/2 |
| 4,354,092 | 10/1982 | Manabe et al. | 320/2 X |
| 4,467,263 | 8/1984 | Conforti et al. | 320/2 |

FOREIGN PATENT DOCUMENTS

| | | | |
|---|---|---|---|
| 1017703 | 10/1957 | Fed. Rep. of Germany . | |
| 1069286 | 11/1959 | Fed. Rep. of Germany . | |
| 0157874 | 12/1980 | Japan | 320/2 |
| 0061273 | 4/1982 | Japan | 320/2 |
| 0072277 | 5/1982 | Japan | 320/2 |
| 191368 | 4/1964 | Sweden . | |

*Primary Examiner*—R. J. Hickey

*Attorney, Agent, or Firm*—Emrich & Dithmar

[57] ABSTRACT

A three position slidable switch for use in a portable, rechargeable electrical device includes ON, OFF, and CHARGE positions. In the ON position a rechargeable battery is coupled in circuit with the device for the operation thereof. In the OFF position the battery is electrically decoupled from the device which is in an OFF state. In the CHARGE position the battery is coupled to a pair of prongs adapted to be plugged into an electrical outlet. Displacement of the switch to the CHARGE position rotates the prongs to an extended position to permit the battery to be recharged by means of a conventional AC outlet. In the ON and OFF positions of the switch, the prongs are retracted within the switch assembly. The switch includes detent means in each of the three aforementioned positions to reduce the possibility of inadvertent re-positioning of the switch and to provide a tactile indication to the user of the switch position. In one embodiment the prongs are spaced apart in the direction of elongation of the device and in another embodiment the prongs are spaced apart in a direction perpendicular to the direction of elongation of the device.

21 Claims, 17 Drawing Figures

FIG. 14
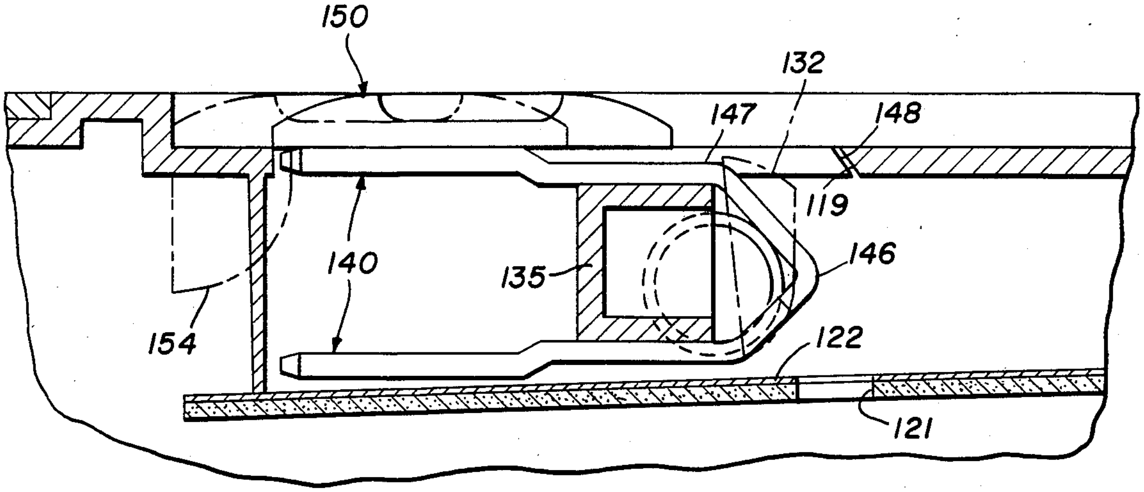
FIG. 15
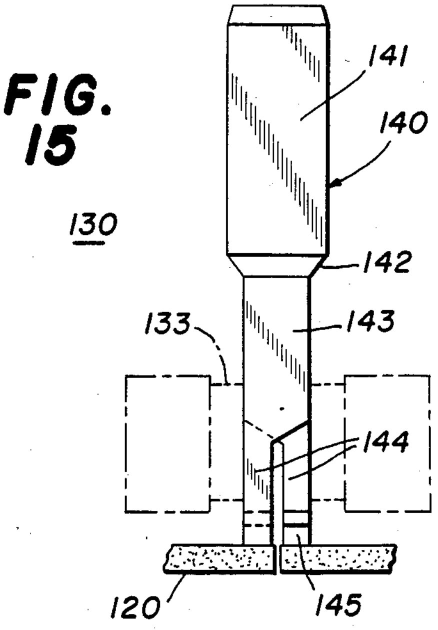
FIG. 16
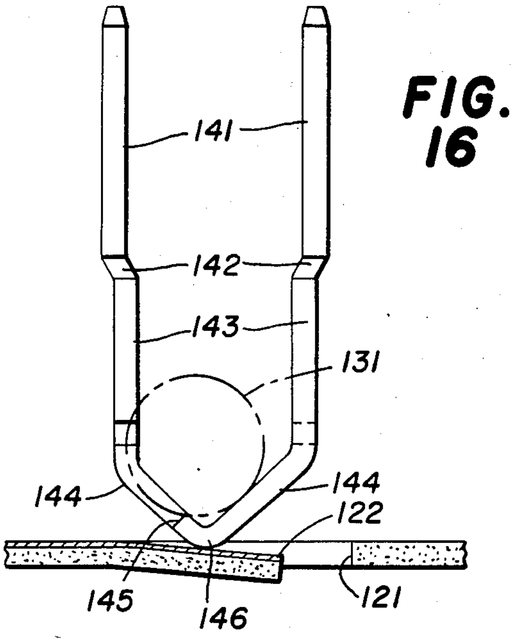
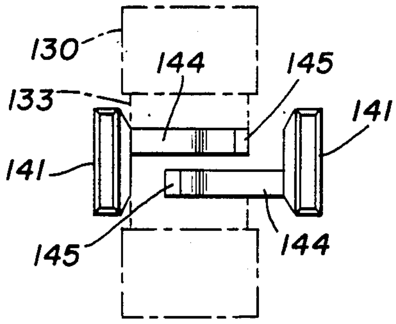
FIG. 17

THREE POSITION SWITCH FOR PORTABLE, RECHARGEABLE DEVICE

CROSS-REFERENCE TO RELATED APPLICATION

This is a continuation-in-part of U.S. application Ser. No. 634,774, filed July 26, 1984, now abandoned, and entitled, "Three Position Switch".

BACKGROUND OF THE INVENTION

This invention relates generally to electrical switches and is particularly directed to a multi-position switch for use in an electrical device having a rechargeable battery.

There are currently available many electrically operated devices which utilize rechargeable batteries as their power source. Such devices include, but are not limited to, toothbrushes, flashlights, radios, tape recorders, cigarette lighters, grass shears, hedge trimmers, screwdrivers, and the like. These devices generally have a control switch operable between ON and OFF positions for controlling the operation of the device. In addition, a pair of electrical prongs are provided for insertion in a conventional AC outlet for the recharging of the storage batteries therein.

In early rechargeable devices the electrical prongs extending therefrom were subject to damage and deformation by contact with other objects. This problem was somewhat alleviated in later designs by positioning the electrical prongs within a recessed portion of the device. While this arrangement provided a certain amount of protection for the elongated prongs, it unfortunately increases the complexity and cost of the rechargeable device. Moreover, in this arrangement it was still possible to turn the device on while attempting to recharge its batteries. In most cases, such operation would prevent the recharging of the batteries and preclude normal operation of the device.

In some rechargeable electrical devices the recharging of the batteries is accomplished either by a separate recharging unit or by a recharging unit integral with the device. The separate recharging unit approach has the disadvantage of requiring the storage of the recharging unit when not in use and of not having the recharging unit immediately available when needed. A disadvantage of the integrated recharging unit approach is that the device must be adapted for easy connection to a conventional AC outlet while avoiding the aforementioned problems of electrical prong damage and wear.

The present invention is intended to overcome the aforementioned limitations of the prior art by providing an integrated control switch and electrical connector for a rechargeable electrical device wherein electrical prongs are pivotally displaceable between a retracted, non-use position and an extended, recharge position by means of the linear displacement of the switch assembly. The switch is arranged to disconnect the battery from the rechargeable electrical device when the electrical prongs are disposed in their extended, recharge position. The switch assembly of the present invention thus performs several functions in a rechargeable electrical device by means of a compact, easily manipulated, and highly reliable electromechanical structure.

SUMMARY OF THE INVENTION

Accordingly, it is an object of the present invention to provide an improved electrical control switch for use in an electrical device having a rechargeable battery.

It is another object of the present invention to provide for the ON, OFF and CHARGE states in a rechargeable electrical apparatus by means of a single control switch.

Still another object of the present invention is to provide for the safe and reliable charging of a rechargeable battery in a portable electrical device.

A further object of the present invention is to provide a multi-position switch in a rechargeable electrical apparatus wherein a recharging connector is extended in the CHARGE position and fully retracted in the ON and OFF positions.

A still further object of the present invention is to provide an integrated structure for controlling the operation of a rechargeable electrical apparatus and for coupling the apparatus to an external power source for the recharging of a storage battery therein.

The present invention contemplates in a rechargeable device including a battery operated unit, a rechargeable battery for the operation thereof, a recharging circuit coupled to the rechargeable battery, and a common casing for the unit and the battery and the circuit, the improvement comprising: a pair of electrical prongs adapted for electrical coupling to an associated power source, means mounting the prongs on the casing for movement between a retracted non-use position and an extended use position for coupling to the associated power source, displacement means on the casing movable with respect to the mounting means among first and second and third positions, movement of the displacement means between the first and second positions effecting movement of the prongs between the use and non-use positions thereof, and conductive means electrically connecting the prongs to the recharging circuit when the prongs are disposed in the use position thereof, the conductive means electrically connecting the battery to the battery operated unit when the displacement means is disposed in the third position thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 14 is a fragmentary view, similar to FIG. 13 illustrating the ON and OFF positions of the switch, wherein the electrical prongs are retracted;

FIG. 15 is a front elevational view of the prongs of FIG. 13;

FIG. 16 is a side elevational view of the prongs of FIG. 15; and

FIG. 17 is a top plan view of the prongs of FIG. 16.

DESCRIPTION OF THE PREFERRED EMBODIMENTS

Figure 1:
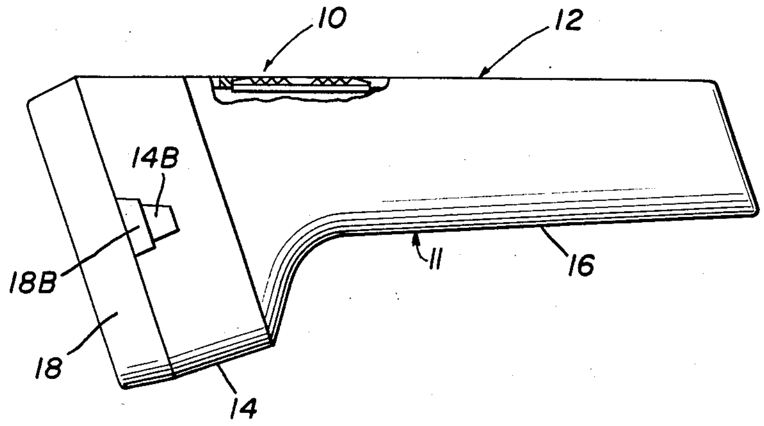
FIG. 1 is a partially cutaway side elevational view of a rechargeable flashlight incorporating a three position switch in accordance with a first embodiment of the present invention, with the switch illustrated in its ON condition.

Referring to FIG. 1, there is shown a partially cutaway lateral view of a flashlight 12 having a casing 11 and incorporating a three position switch 10 in accordance with a first embodiment of the present invention. While the three position switch 10 is described herein for use in a flashlight 12, the present invention is not limited to such an application and is compatible with virtually any electrical device which employs a rechargeable battery.

Figure 2:
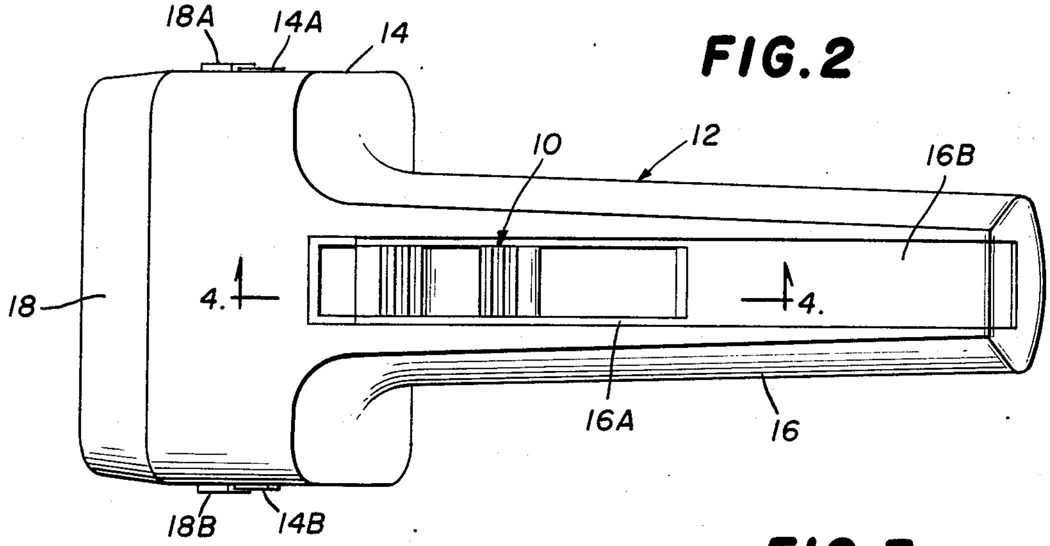
FIG. 2 is an enlarged top plan view of the rechargeable flashlight of FIG. 1, showing the three position switch therein.

The flashlight 12 includes a forward, expanded portion 14 and an aft, elongated portion 16 of the flashlight casing 11. Positioned within an elongated slot 16A on an upper, flat surface 16B of the aft, elongated portion 16 of the casing 11 is the three position switch 10. A forward portion of the elongated portion 16 of the casing 11 is integral with the forward, expanded portion 14. Respective lateral surfaces of the forward, expanded portion 14 are provided with right and left mounting sleeves 18A, 18B. As used hereinafter, right and left refer to various portions of the flashlight 12 and three position switch 10 with the combination viewed from the rear, i.e., from the right as viewed in FIGS. 1 and 2. Positioned on the front of the forward, expanded portion 14 of the casing 11 is a rim, or bezel 18 which includes right and left mounting shoulders 14A, 14B. The right and left mounting shoulders 14A, 14B are adapted to be respectively inserted in a tight fitting manner within the right and left mounting sleeves 18A, 18B of the forward, expanded portion 14 of the casing 11. It is in this manner that the rim 18 may be removably attached to the front of the flashlight 12. The rim 18 is adapted to maintain a lens (not shown) in position in the front of the flashlight 12.

Figure 3:
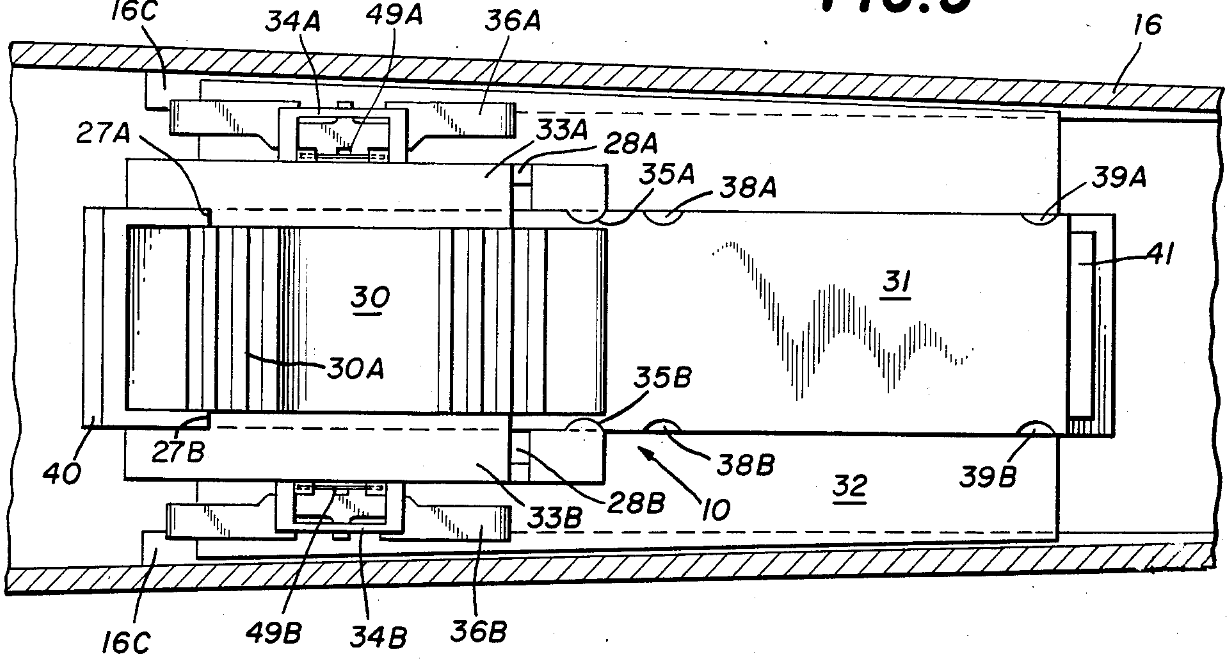
FIG. 3 is a further enlarged, fragmentary top plan view of the cutaway portion of the flashlight of FIG. 1, showing the details of the three position switch of the present invention.
Figure 6:
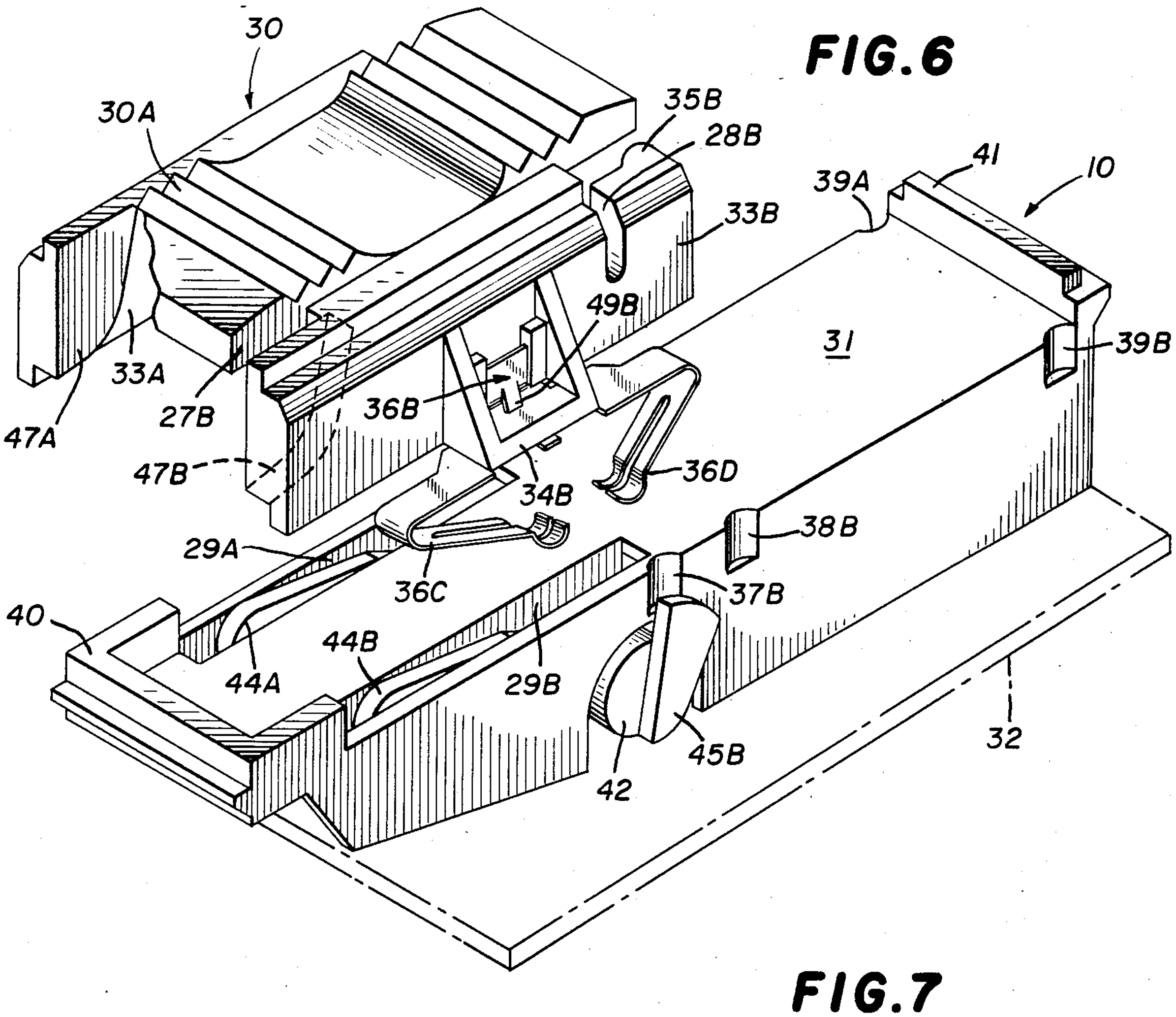
FIG. 6 is a partially exploded perspective view of the three position switch illustrated in FIGS. 3–5.

Referring to FIGS. 3 and 6 the three position switch 10 includes a slide assembly 30 positioned upon and linearly displaceable along a support housing 31. The slide assembly 30 rests upon an upper portion of the support housing 31 and is freely displaceable therealong, with right and left slide assembly lateral walls 33A, 33B in contact with respective lateral portions of the support housing 31 in order to maintain proper alignment between the slide assembly 30 and the support housing 31. The support housing 31 is firmly positioned upon a printed circuit board 32 in a manner described below. An upper surface of the slide assembly 30 is provided with a plurality of parallel grooves 30A to facilitate manual engagement and displacement of the slide assembly 30.

The right and left slide assembly lateral walls 33A, 33B are respectively provided with right and left switch contact mounts 34A, 34B. Each of the switch contact mounts 34A, 34B extends outward from a respective lateral wall of the slide assembly 30 and is adapted to engage and hold a respective flexible, conductive switch contact 36A, 36B. Each of the switch contacts 36A and 36B includes forward and aft lower resilient portions 36C, 36D, as shown in FIG. 6 for the left switch contact 36B, which extend downward from the slide assembly 30 and are positioned in contact with respective conductive strips on the upper surface of the circuit board 32 as described below. In addition, each of the right and left switch contacts 36A, 36B includes a respective retention finger 49A, 49B for respectively engaging the right and left switch contact mounts 34A, 34B in providing for the stable positioning of a switch contact thereon.

Positioned on respective aft, inner portions of the slide assembly lateral walls 33A, 33B are right and left switch detent inserts 35A, 35B. Right and left slots 28A, 28B in the right and left slide assembly lateral walls 33A, 33B provide flexibility in the respective aft portions of the slide assembly lateral walls on which the switch detent inserts 35A, 35B are positioned. The switch detent inserts 35A, 35B are adapted to be positioned within various pairs of detents located in the upper, lateral portions of the switch support housing 31. The various pairs of detents on the switch support housing 31 are the forward, or ON, position detents 37A, 37B, the intermediate, or OFF, position detents 38A, 38B, and the aft, or CHARGE, position detents 39A, 39B. Thus, when the slide assembly 30 is in the full forward position, the switch 10 in the ON position; with the slide assembly 30 in an intermediate position; the switch 10 is in the OFF position; and with the slide assembly 30 in the full aft position, the switch 10 is in the CHARGE position. The various electrical coupling arrangements which provide for these various operating states are described below. The combination of the various inserts and position detents provide a tactile indication to the switch operator of the position of the switch 10 and reduce the possibility of inadvertent movement of the slide assembly 30 on the switch support housing 31.

The circuit board 32 is generally flat and includes various circuit components on one or both sides thereof. The circuit board 32 is positioned within the flashlight 12 and rests upon and is supported by right and left mounting tabs 16C positioned on respective inner, lateral portions of the aft, elongated portion 16 of the flashlight casing 11. Positioned on respective forward and aft upper portions of the switch support housing 31 are forward and aft positioning shoulders 40, 41. The forward and aft positioning shoulders 40, 41 are adapted to engage in tight fitting relation respective forward and aft portions of the slot 16A in the upper surface of the flashlight 12 within which the three position switch 10 is inserted. This arrangement ensures stable positioning of the switch 10 within the flashlight 12.

Rotationally positioned within the support housing 31 and aligned generally transverse to its longitudinal direction is a shaft, or axle, 42. Securely mounted to respective end portions of the rotating shaft 42 are right and left cams 45A, 45B. Securely coupled to respective right and left intermediate portions of the rotating shaft 42 are parallel, elongated right and left prongs, or AC contacts, 44A, 44b. The right and left cams 45A, 45B positioned on respective ends of the rotating shaft 42 extend slightly beyond the lateral portions of the switch support housing 31. Included in the right and left slide assembly lateral walls 33A, 33B are right and left cam surfaces 47A, 47B.

Figures 4, 5:
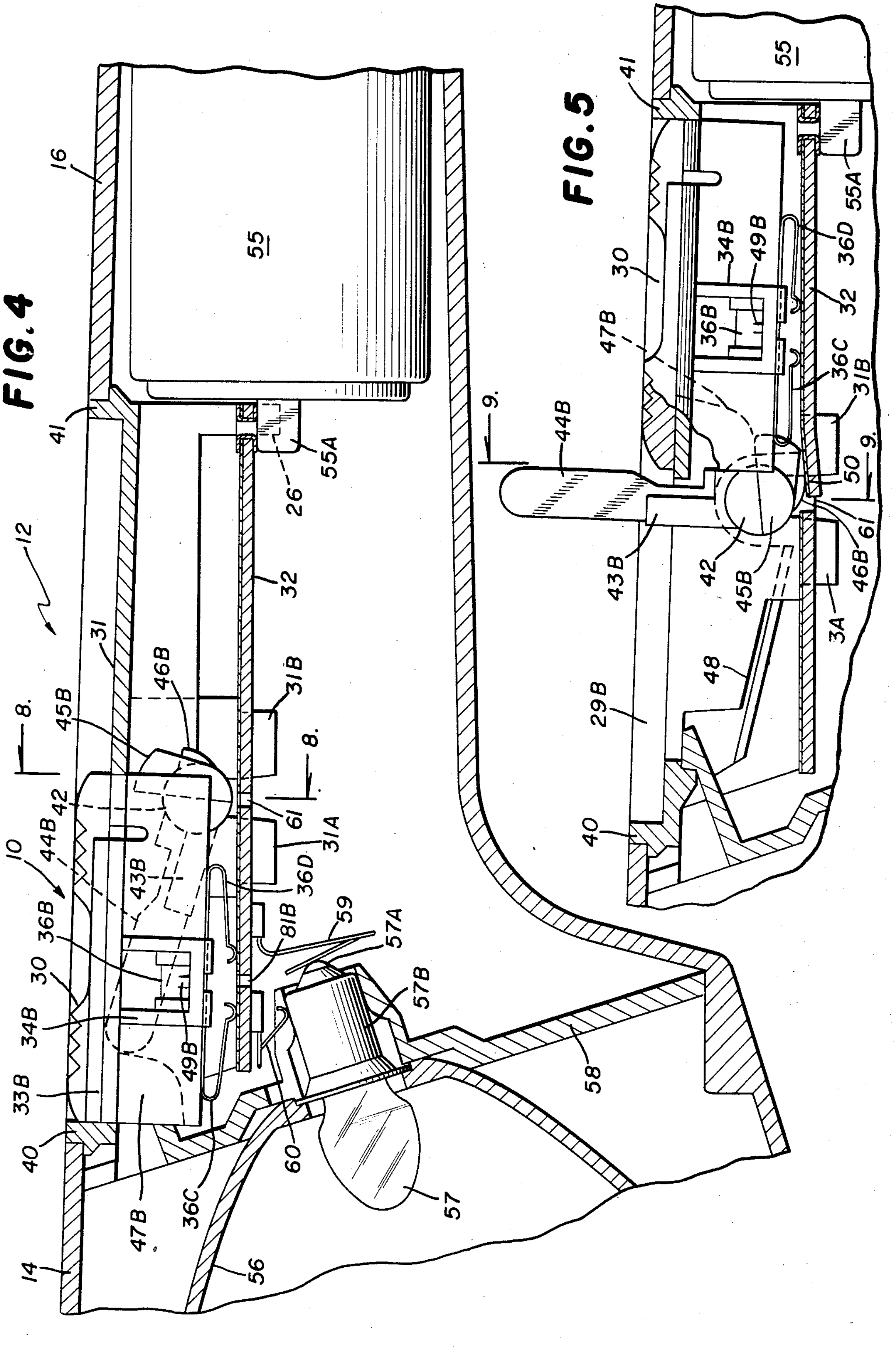
FIG. 4 is a further enlarged, fragmentary view in vertical section taken along the line 4—4 in FIG. 2.
FIG. 5 is a fragmentary view similar to FIG. 4, showing the three position switch in the battery recharge position.

Rearward displacement of the slide assembly 30 from the ON position, illustrated in FIG. 4, along the support housing 31 causes the right and left cam surfaces 47A, 47B to contact and engage the right and left cams 45A, 45B, respectively, causing the angular displacement of the cams 45A, 45B and the rotating shaft 42 to which each is coupled. With the right and left prongs 44A, 44B coupled to intermediate right and left portions of the shaft 42, rotation of the shaft 42 will cause a corresponding angular displacement in the right and left prongs 44A, 44B. Thus, when the slide assembly 30 is disposed in its CHARGE position, illustrated in FIG. 5, the right and left prongs 44A, 44B will be angularly displaced upward through respective right and left slots 29A, 29B within an upper portion of the switch support housing 31 and are oriented generally perpendicular to the upper surface thereof. In this position the prongs 44A, 44B may be inserted in a conventional AC outlet for charging of the rechargeable battery (see FIG. 10) in the flashlight 12, as described below.

Following recharging of the battery with the slide assembly 30 in the full aft or CHARGE position, the slide assembly 30 may be displaced forward along the support housing 31 such that right and left forward slots 27A, 27B in the slide assembly 30 become aligned with and engage the right and left prongs 44A, 44B, respectively. Further forward displacement of the slide assembly 30 to the OFF position will cause angular displacement of the prongs 44A, 44B and rotation of the shaft 42 to which they are mounted. In this manner, the right and left prongs 44A, 44B may be repositioned within the switch support housing 31 following charging of the rechargeable battery in the flashlight 12. This feature of the three position switch 10 of the present invention is described in greater detail below.

Referring to FIG. 4, a mounting insert 58 is positioned generally at the junction of the forward, expanded and aft, elongated portions 14, 16 of the casing 11. The center of the mounting insert 58 includes a recessed portion having an aperture therein within which is inserted a light bulb 57. Positioned within the forward portion 14 of the casing 11 and maintained therein by means of ring 18 (see FIGS. 1 and 2) is a concave reflector 56. The reflector 56 is maintained in abutting contact with the light bulb 57 and the mounting insert 58 by means of the ring 18. The light bulb 57 includes first and second terminals 57A and 57B. The first terminal 57A is coupled to the circuit board 32 via a positive lead 59, while the light bulb's second terminal 57B is coupled to neutral ground potential on the circuit board 32 via a negative lead 60. Applying a DC voltage across the light bulb 57 via positive and negative leads 59, 60 causes the illumination of the light bulb 57.

A center, lower portion of the switch support housing 31 includes forward and aft pairs of mounting inserts 31A, 31B received in mounting slots 32A, 32B in the circuit board 32 (FIGS. 4, 7 and 8), with the inserts 31A being inserted in the slots 32A and the inserts 31B being inserted in the slots 32B. An aft mounting slot 25 is positioned on the rear edge of the circuit board 32 and receives therein an aft mounting insert 26 located on a rear portion of the switch support housing 31. Insertion of the various mounting inserts on the lower portion of the switch support housing 31 into the various mounting slots in the circuit board 32 maintains the switch support housing 31 securely in position upon an upper surface of the circuit board 32.

From FIGS. 4, 5, 8 and 9, it can be seen that when the switch slide assembly 30 is moved toward the rear of the flashlight, or to the right in FIGS. 4 and 5, the cam surfaces 47A and 47B, respectively contact the cams 45A and 45B mounted on the rotating shaft 42. Further rearward displacement of the slide assembly 30 results in the clockwise rotational displacement of the combination of the rotating shaft 42 and the cams 45A and 45B. The prongs 44A and 44B are coupled to an intermediate portion of the shaft 42 by means of coupling assemblies 43A and 43B (see FIG. 9) and rotate therewith. Thus, when the cams 45A and 45B are displaced downward by means of the cam surfaces 47A and 47B on the slide assembly 30, the combination of the shaft 42, the coupling assemblies 43A and 43B, and the prongs 44A and 44B is rotated clockwise such that the prongs 44A and 44B are oriented generally perpendicular to the upper surface of the switch support housng 31.

Figure 9:
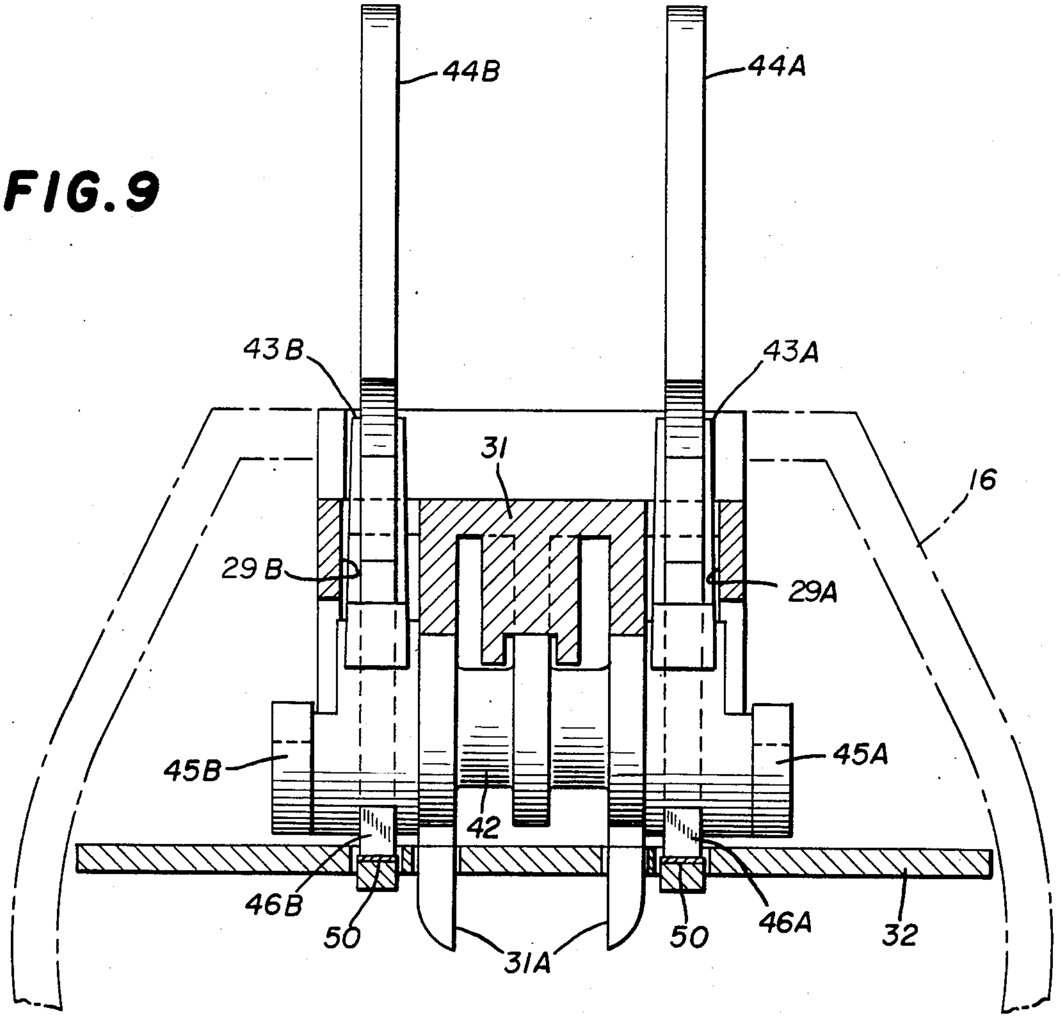
FIG. 9 is a still further enlarged view in vertical section taken along the line 9—9 in FIG. 5.
Figure 12:
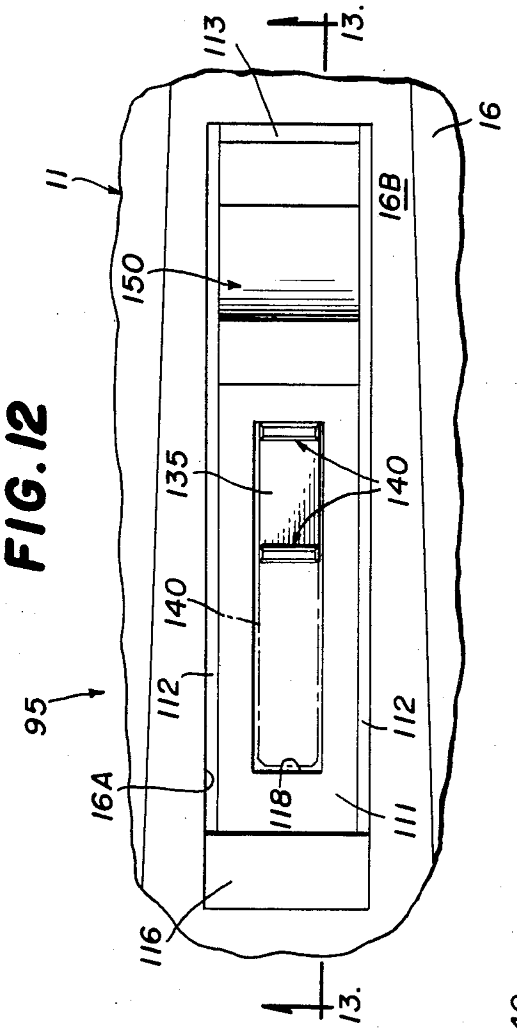
FIG. 12 is an enlarged, fragmentary, top plan view of the flashlight of FIG. 11, illustrating the three way switch thereof in its battery recharge position.

Also positioned on intermediate portions of the rotating shaft 42 and in electrical contact with respective right and left prongs 44A, 44B are right and left electrical contacts 46A, 46B. With the prongs 44A and 44B oriented generally vertically as shown in FIG. 5, the electrical contacts 46A and 46B are positioned in abutting contact with respective contact strips on the upper surface of the circuit board 32. These contact strips are shown as elements 50 in FIGS. 5, 7 and 9 and each is positioned within a respective slot 61 within circuit board 32. With the prongs 44A, 44B oriented generally vertically, the right and left electrical contacts 46A, 46B coupled thereto abut respective contact strips 50 and deflect them downward through a respective slot 61 as shown in FIG. 9. When the prongs 44A and 44B are coupled to a power source, such as a conventional AC outlet, a current path is provided via the electrical contacts 46A, 46B and the circuit board 32 to the rechargeable battery 55 for the charging thereof.

Figure 7:
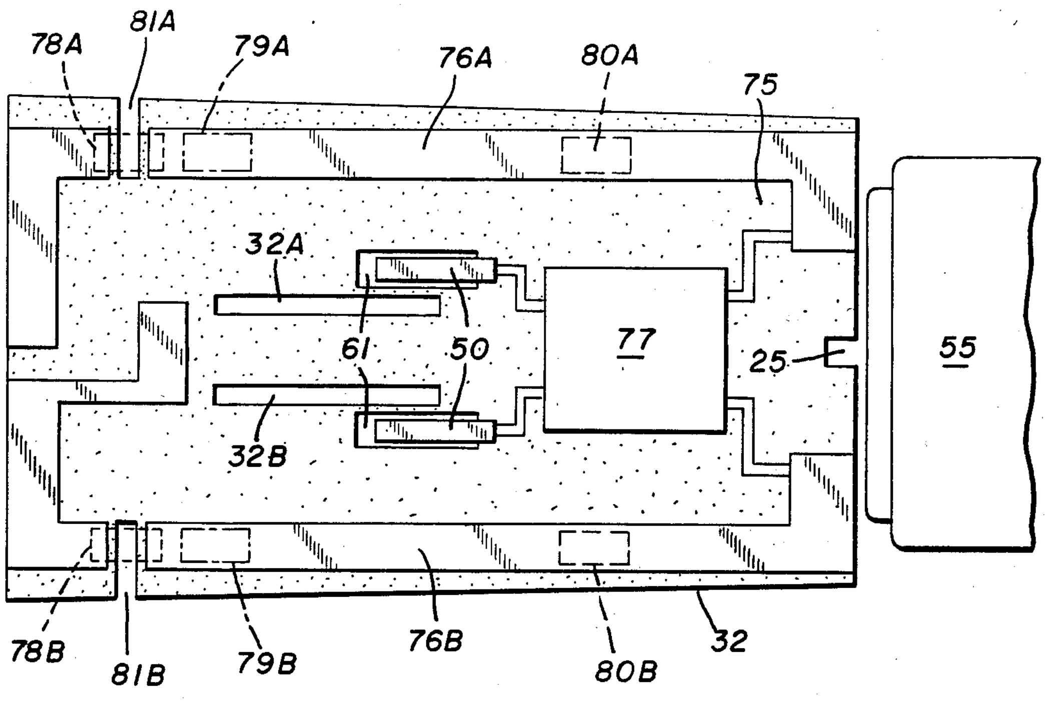
FIG. 7 is a top plan view of the circuit board which forms a part of the three position switch of FIG. 6 and by means of which the rechargeable battery is coupled to the flashlight's light bulb and to the electrical prongs.

When charging of the battery 55 is complete, the slide assembly 30 is displaced forward along the support housing 31 to either an intermediate OFF position or to a full forward ON position, shown in FIG. 4. In the full forward position, the forward and aft lower resilient portions 36C and 36D of the right and left switch contacts 36A, 36B bridge respective slots 81A and 81B in forward, lateral portions of the circuit board 32 as shown in FIG. 4. The locations of both the right and left forward circuit board slots 81A, 81B are also shown in FIG. 7. The conductive path between the battery 55 and the flashlight bulb 57 afforded by the conducting strips 76A and 76B is normally interrupted by the slots 81A and 81B so that the bulb 57 is deenergized. The right and left switch contacts 36A, 36B bridge respective forward circuit board slots 81A, 81B when the slide assembly 30 is in the full forward, or ON, position so as to couple respective forward and aft portions of the right and left conducting strips 76A and 76B positioned on an upper surface of the circuit board 32, thereby to energize the bulb 57. The combination of the forward circuit board slots 81A, 81B and the forward and aft lower resilient portions of the right and left switch contacts 36A, 36B prevents solder tracking along the respective right and left conductive strips 76A and 76B.

When the switch side assembly 30 is displaced forward along the support housing 31, right and left slots 27A, 27B located in a forward portion of the slide assembly 30 respectively engage right and left prongs 44A, 44B and displace the prongs downward, or in a counterclockwise direction, as viewed in FIGS. 4 and 5, about the axis of rotating shaft 42. As shown in FIG. 4, in this position the right and left prongs 44A, 44B are completely enclosed within the switch support housing 31 and are no longer coupled in circuit with the circuit board 32. The downward displacement and retraction of the prongs 44A and 44B occurs when the slide assembly 30 is in the intermediate OFF position as well as in the full forward ON position, shown in FIG. 4. When the slide assembly 30 is in the full forward position, counterclockwise rotation of the prongs 44A and 44B is terminated when they contact respective right and left rotational stops 48 (one shown) positioned on respective forward, lateral portions of the support housing 31. As shown in FIGS. 4 and 5, the battery 55 is provided with at least one terminal 55A on a forward portion thereof which is coupled in circuit with the circuit board 32. The battery 55 may thus be recharged via the AC contact prongs 44A, 44B and the circuit board 32 or may discharge via the combination of circuit board 32 and right left switch contacts 36A, 36B for illuminating the light bulb 57.

Referring to FIG. 7, there is shown a top plan view of the circuit board 32 upon which the three position switch 10 of the present invention may be mounted and by means of which the rechargeable battery 55 is coupled to the flashlight's light bulb 57 and to the electrical prongs 44A and 44B (not shown in FIG. 7). As previously described, the circuit board 32 includes right and left conducting strips 76A, 76B positioned on an upper surface and along a lateral edge thereof. Each of the conducting strips 76A, 76B is interrupted by means of a respective slot 81A, 81B in order to prevent solder tracking by the displacement of the electrical contacts 36A, 36B along the conducting strips 76A, 76B. Solder tracking could cause the unintended turn-on of the flashlight 12, and the slots 81A and 81B are intended to prevent this.

The location of the right and left switch contacts 36A, 36B for various operating positions of the switch are shown in dotted line form in FIG. 7. For example, positions 78A and 78B indicate the location of the switch contacts 36A, 36B along the respective conducting strips 76A, 76B when the three position switch 10 is in the ON position. Similarly, locations 79A and 79B represent the position of the switch contacts 36A, 36B along the right and left conducting strips 76A, 76B when the three position switch 10 is in the OFF position. Finally, locations 80A and 80B along the right and left conducting strips 76A, 76B represent the position of the electrical switch contacts 36A, 36B when the three position switch 10 is in the CHARGE position.

The circuit board 32 contemplated for use in the present invention is of conventional design and therefore would generally include a substrate 75 upon which are positioned the right and left conducting strips 76A, 76B, which in a preferred embodiment would be comprised of copper. Also positioned in circuit with the AC contact strips 50 is a charging circuit 77 which, for simplicity sake, is merely shown as a block in FIG. 7. The charging circuit 77 couples the AC contact strips 50 to the battery terminal 55A and would typically include a rectifier, a voltage regulation circuit, and other conventional circuitry for coupling the AC input to the battery 55. Also positioned on either the upper or lower surface of the circuit board 32 would be other circuitry of a conventional nature for coupling the battery 55 to the light bulb 57 for the illumination thereof. The configuration and operation of the various circuitry positioned upon the circuit board 32 for providing for the recharging of battery 55 and the proper operation of the electrical device with which the three position switch 10 and the battery 55 operate may be conventional in nature, does not form a part of the present invention, and is not, therefore, discussed further herein.

Figure 8:
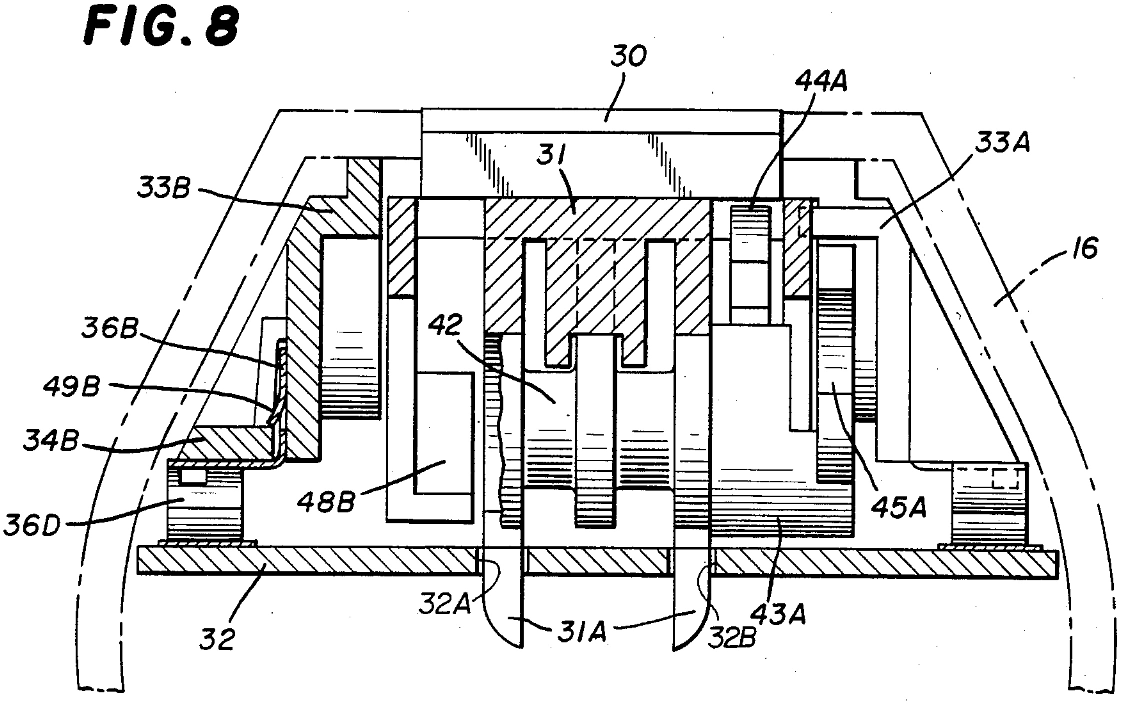
FIG. 8 is a still further enlarged view in vertical section, taken along the line 8—8 in FIG. 4.

Additional details of the mounting of the left switch contact 36B within the left switch contact mount 34B can be seen in FIG. 8. A sectional view of the upper portion of the switch contact 36B shows that it is generally L-shaped with the forward and aft lower resilient portions 36C, 36D extending downward from a horizontal portion thereof. Also from FIG. 8, it can be seen how the rotating shaft 42 is retained within the support housing 31 by means of the forward and aft mounting inserts 31A, 31B, between which the shaft 42 is rotationally mounted. Also from FIG. 8, it can be seen that cams 45A, 45B are coupled to and integral with respective right and left coupling assemblies 43A, 43B which, in turn, are mounted on respective ends of the rotating shaft 42 and to which are securely coupled the right and left prongs 44A, 44B. The left prong rotational stop 48B is shown disposed on a lower, forward, inner portion of the left lateral wall of the switch support housing 31.

In FIG. 9, the right and left electrical contacts 46A, 46B electrically coupled to the right and left prongs 44A, 44B are shown in contact with a respective one of the contact strips 50 on the circuit board 32. Each of the contact strips 50 is deflected downward by means of a respective electrical contact 46A, 46B for coupling the rechargeable battery 55 in circuit with the AC contact prongs 44A and 44B.

Figure 10:
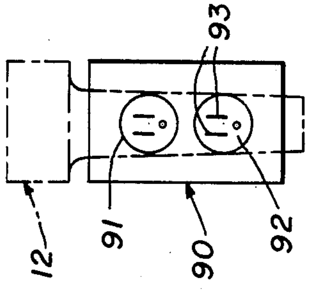
FIG. 10 is a side elevational view of a wall receptacle fixture illustrating the manner in which the flashlight of FIG. 1 may be plugged thereinto.

Referring to FIG. 10, there is illustrated a standard wall receptacle fixture 90 having two outlets 91 and 92, each comprising a pair of sockets 93. The receptacle fixture 90 has a common arrangement, wherein the sockets 93 of each pair thereof are spaced apart in a direction perpendicular to the direction of alignment of the two outlets 91 and 92. Since the prongs 44A and 44B of the switch 10 are spaced apart in a direction perpendicular to the direction of elongation of the flashlight 12, this means that when the prongs 44A and 44B are plugged into one of the outlets 91 or 92, the flashlight 12 will also block the other outlet, as indicated in FIG. 10.

Figure 11:
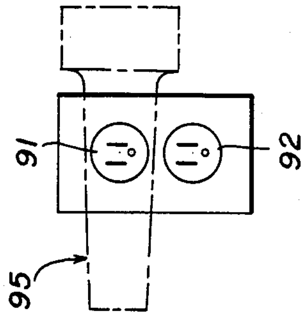
FIG. 11 is a view similar to FIG. 10, illustrating the manner in which a flashlight in accordance with the second embodiment of the invention may be plugged thereinto.

In order to avoid this condition, there is also provided an alternative embodiment of the flashlight of the present invention, generally designated by the numeral 95 and illustrated in FIG. 11, arranged so that the switch prongs thereof are spaced apart in the direction of elongation of the flashlight 95, so that when the flashlight 95 is plugged into one of the outlets 91 or 92, the other outlet will not be blocked, as best illustrated in FIG. 11.

The flashlight 95 is substantially identical to the flashlight 12, except for the three position switch. Therefore, common parts of the flashlights 12 and 95 are indicated by the same reference numerals. Referring now to FIGS. 12 through 17, the flashlight 95 includes a three position switch 100, which is similar to the switch 10 and includes a support housing 110. The support housing 110 has a flat, generally rectangular top wall 111, bounded on the opposite sides thereof by a pair of side walls 112, each of which projects a predetermined distance upwardly above the top wall 111. The side walls 112 are interconnected, at one end thereof by a rear end wall 113, and a predetermined distance from the front end thereof by a depending front wall 114. An upstanding front wall 115 is integral with the top wall 111 at the front edge thereof and interconnects the side walls 112. Integral with the front wall 115 at its forward end and projecting forwardly therefrom is a ledge 116 which is parallel to the top wall 111. Integral with the ledge 116 at its forward end is a forwardly extending attachment flange 117. Formed in the top wall 111 is an elongated rectangular opening 118 having a downwardly and rearwardly beveled rear edge 119 (see FIG. 13). In use, the support housing 110 is mounted in the elongated slot 16A in the elongated portion 16 of the flashlight casing 11, with the upper surface of the ledge 116 being substantially coplanar with the surface 16B, and with the attachment flange 117 being disposed beneath the outer wall of the forward portion 14 of the casing 11.

Figure 13:
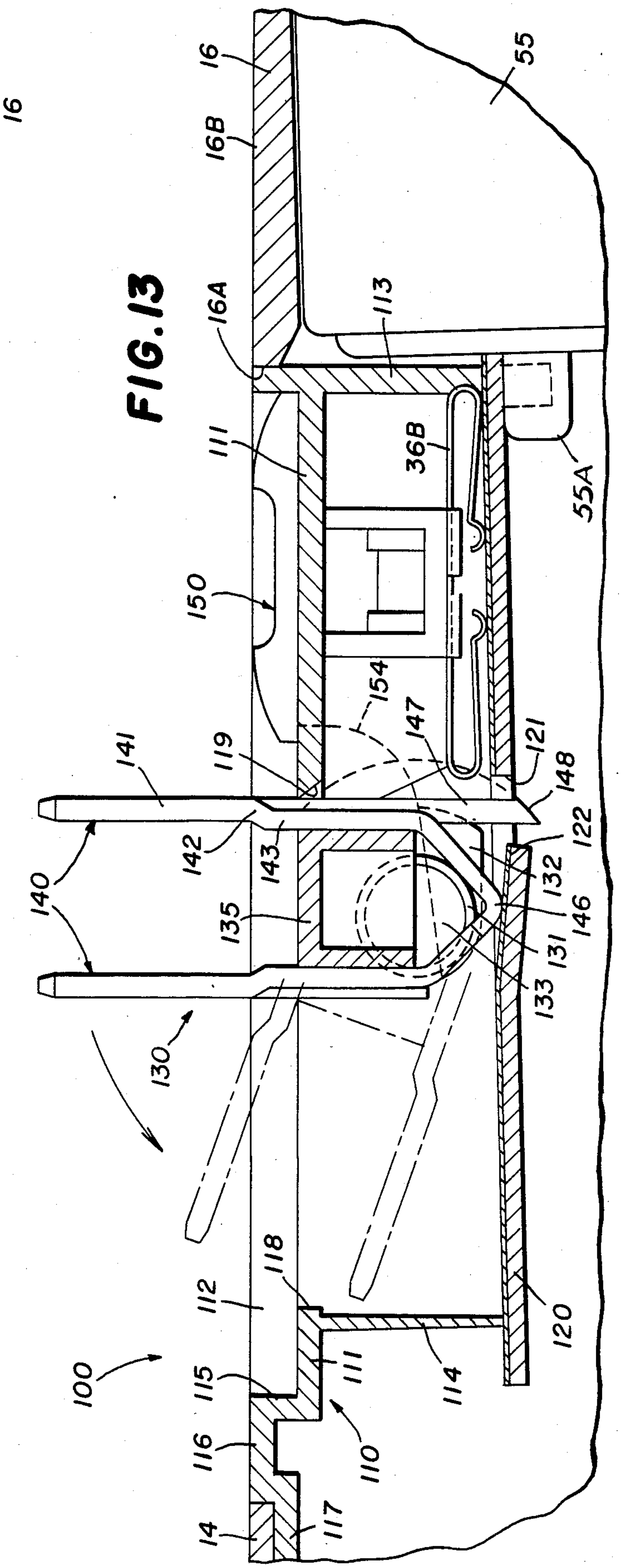
FIG. 13 is a further enlarged fragmentary view in vertical section taken along the line 13—13 in FIG. 12, and illustrating the movement of the prongs to their retracted position.

The three position switch 100 also includes a printed circuit board 120 which is substantially similar to the circuit board 32, described above, except that the circuit board 120 has slots 121 in place of the slots 61 and is provided with contact strips 122 in place of the contact strips 50, the contact strips 122 projecting rearwardly into the slots 121, as can best be seen in FIGS. 13 and 16.

The three position switch 100 also includes a prong assembly 130 which includes a shaft 131 mounted in the support housing 110 for rotation about an axis extending laterally between the side walls 112. Integral with the shaft 131 at the opposite ends thereof are two cams 132, similar to the cams 45A and 45B, described above. The shaft 131 has a reduced-diameter central portion 133 to which is secured a spacer block 135.

The prong assembly 130 also includes a pair of prongs 140 spaced apart by the spacer block 135 longitudinally of the support housing 110. Each of the prongs 140 has a relatively wide outer or distal end portion 141, coupled at its inner end by an offset portion 142 to a reduced width inner end portion 143. Each inner end portion 143 is integral with an angled flange 144 of still further reduced width which is inclined downwardly towards the opposite one of the prongs 140, extending beneath the central portion 133 of the shaft 131. Each angled flange 144 is provided at its distal end with an upturned tip 145, the junction therebetween defining a rounded contact portion 146. Integral with the rearward one of the prongs 140 projecting from the inner end of the inner end portion 143 parallel thereto is a cover plate 147, having a beveled end 148.

In use, the prong assembly 130 is pivotally movable about the axis of the shaft 131 between an extended use position, illustrated in solid line in FIG. 13, and a retracted non-use position, illustrated in FIG. 14. When the prong assembly 130 is in its extended use position, the prongs 140 project outwardly from the casing 11 in position to be plugged into an outlet 91 or 92 of a receptacle fixture 90. In this position, the contact portions 146 respectively engage the contact strips 122 on the circuit board 120, deflecting them downwardly, and providing an electrical connection between the associated AC source and the charging circuit 77, as described above. In this position also, the distal end of the cover plate 147 is accommodated in the slot 121 in the circuit board 120.

When the prong assembly 130 is disposed in its retracted position, the prongs 140 are out of contact with the contact strips 122 and are fully received within the support housing 110. In this position, the upper one of the prongs 140 cooperates with the cover plate 147 to close the opening 118 in the top wall 111 of the support housing 110, the beveled end 148 of the cover plate 147 mating with the beveled rear edge 119 of the opening 118.

The three position switch 100 also includes a slide assembly 150, which is substantially similar to the slide assembly 30, described above, and having switch contacts 36A and 36B and cam surfaces 154. The slide assembly 150 operates in the same manner as the slide assembly 30 described above, being longitudinally slidably movable along the support housing 110 among a rearward CHARGE position, illustrated in FIG. 13, a full forward ON position, illustrated in broken line in FIG. 14, and an intermediate OFF position, illustrated in solid line in FIG. 14.

As the slide assembly 150 is moved forwardly from its CHARGE position, its forward end engages the rearmost one of the prongs 140, thereby driving the prong assembly 130 into pivotal movement about the axis of the shaft 131 in a counterclockwise direction, as viewed in FIG. 13, to its fully retracted non-use position. The slide assembly 150 in its OFF position substantially covers the prong assembly 130 in its retracted position. As the slide assembly 150 is moved from its OFF position to its ON position, the switch contacts 36A and 36B close a circuit between the battery 55 and the lamp bulb 57, in the same manner as was described above in connection with the flashlight 12. When the slide assembly 150 is moved rearwardly from its OFF position, the cam surfaces 154 engage the cams 132 for camming the prong assembly 130 into clockwise pivotal movement upwardly to its extended use position.

Because the outer end portions 141 of the prongs 140 lie in parallel planes which are spaced apart in the direction of elongation of the flashlight casing 11, they can be inserted in one of the outlets 91 or 92 of the receptacle fixture 90, without the flashlight 95 interfering with the other one of the outlets, as illustrated in FIG. 11.

There has thus been shown a multi-position slidable switch particularly adapted for use in an electrical device having a rechargeable battery. A first, full forward position electrically couples the battery to the device for the operation thereof. A second, intermediate position turns the device off. A third, full aft position puts the rechargeable battery in circuit with a pair of electrical prongs for coupling to a power source, such as a conventional AC outlet, for the charging of the battery. In the first and second positions, the AC contact prongs are fully retracted within the switch assembly, while in the third, charge position the prongs extend from the switch to facilitate their insertion in a conventional power source. Two prong arrangements are provided to permit the device to be plugged into one outlet of a two-outlet receptacle, without blocking the other outlet.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a rechargeable device including a battery operated unit, a rechargeable battery for the operation thereof, a recharging circuit coupled to the rechargeable battery, and a common casing for the unit and the battery and the circuit, the improvement comprising: a pair of electrical prongs adapted for electrical coupling to an associated power source, means mounting said prongs on said casing for only pivotal movement between a retracted non-use position and an extended use position for coupling to the associated power source, conductive means electrically connecting said prongs to the recharging circuit when said prongs are disposed in the use position thereof, and displacement means on said casing adapted for reciproating movement with respect to said mounting means and said prongs between first and second positions for effecting movement of said prongs between the use and non-use positions thereof, respectively, said displacement means being engageable with said mounting means for moving said prongs to the use position thereof and being engageable with said prongs for moving them to the non-use position thereof.

2. The rechargeable device of claim 1, wherein said prongs in the non-use position thereof are electrically disconnected from the recharging circuit.

3. The rechargeable device of claim 1, wherein the common casing is elongated.

4. The control apparatus of claim 3, wherein said prongs are spaced apart substantially in the direction of elongation of the casing.

5. The control apparatus of claim 3, wherein said prongs are spaced apart in a direction substantially perpendicular to the direction of elongation of the casing.

6. The control apparatus of claim 3, wherein said displacement means moves between the first and second positions thereof in a direction substantially parallel to the direction of elongation of the casing.

7. In a rechargeable device including a battery operated unit, a rechargeable battery for the operation thereof, a recharging circuit coupled to the rechargeable battery, and a common casing for the unit and the battery and the circuit, the improvement comprising: a pair of electrical prongs adapted for electrical coupling to an associated power source, means mounting said prongs on the casing for movement between a retracted non-use position and an extended use position for coupling to the associated power source, displacement means on said casing movable with respect to said mounting means among first and second and third positions, movement of said displacement means between said first and second positions effecting movement of said prongs between the use and non-use positions thereof, and conductive means electrically connecting said prongs to the recharging circuit when said prongs are disposed in the use position thereof, said conductive means electrically connecting the battery to the battery operated unit when said displacement means is disposed in the third position thereof.

8. The rechargeable device of claim 7, wherein said conductive means electrically disconnects said prongs from the recharging circuit when said prongs are disposed in the non-use position thereof.

9. The rechargeable device of claim 7, wherein said displacement means in said third position thereof holds said prongs in the non-use position thereof.

10. The rechargeable device of claim 7, wherein said second position of said displacement means is disposed intermediate said first and third positions thereof.

11. The rechargeable device of claim 7, wherein the battery operated unit is a flashlight.

12. The rechargeable device of claim 7, wherein said prongs are pivotally movable between the use and non-use positions thereof.

13. The rechargeable device of claim 12, wherein said displacement means is adapted for reciprocating movement among the first and second and third positions thereof.

14. The rechargeable device of claim 7, wherein said conductive means electrically disconnects the battery from the battery operated unit when said displacement means is in the first and second positions thereof.

15. In a rechargeable device including a battery operated unit, a rechargeable battery for the operation thereof, a recharging circuit coupled to the rechargeable battery, and a common casing for the unit and the battery and the circuit, the improvement comprising: a circuit board carrying the recharging circuit and electrically connecting it to the battery and having first conductive means electrically connected to the battery and to the battery operated unit, a housing positioned on said circuit board, a pair of electrical prongs adapted for electrical coupling to an associated power source, means mounting said prongs on said housing for movement between a retracted non-use position and an extended use position for coupling to the associated power source, said prongs in the use position thereof being electrically connected to the recharging circuit for charging the rechargeable battery, displacement means movable along first and second and third positions on said housing, movement of said displacement means between the first and second positions thereof effecting movement of said prongs between the use and non-use positions thereof, and second conductive means carried by said displacement means and adapted for electrical connection to said first conductive means, said first and second conductive means cooperating to electrically connect the battery to the battery operated unit when said displacement means is in the third position thereof.

16. The rechargeable device of claim 15, wherein said first and second conductive means cooperate to disconnect the battery from the battery operated unit when said displacement means is in the first and second positions thereof.

17. The rechargeable device of claim 15, wherein said mounting means comprises a shaft rotationally positioned in said housing and coupled to respective proximal ends of said prongs.

18. The rechargeable device of claim 17, and further comprising cam means coupled to said shaft, and a cam surface on said displacement means for engaging said cam means in response to movement of said displacement means to the first position thereof for rotating said shaft to pivot said prongs to the use position thereof.

19. The rechargeable device of claim 18, and further comprising first and second recessed portions on said displacement means respectively engageable with said prongs for moving said prongs to the non-use position thereof in response to movement of said displacement means from the first position to the second position thereof.

20. The rechargeable device of claim 15, and further including detent means associated with said displacement means and respectively corresponding to the first and second and third positions thereof for retaining said displacement means in each of said positions.

21. The rechargeable device of claim 15, wherein said circuit board has a plurality of slots therein, said housing having a plurality of mounting inserts receivable in said slots securely to position said housing on said circuit board.

* * * * *